(12) United States Patent
Arputharaj et al.

(10) Patent No.: US 9,681,016 B2
(45) Date of Patent: Jun. 13, 2017

(54) METHODS AND SYSTEMS FOR CAPTURING, SHARING, AND PRINTING ANNOTATIONS

(71) Applicant: Xerox Corporation, Norwalk, CT (US)

(72) Inventors: Vinothkumar Arputharaj, Chennai (IN); Bala Vijay Duraibabu, Hennai (IN); Aravind Sreekumar, Chennai (IN); Saurabh Prabhat, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 164 days.

(21) Appl. No.: 14/190,168

(22) Filed: Feb. 26, 2014

(65) Prior Publication Data
US 2015/0244892 A1    Aug. 27, 2015

(51) Int. Cl.
| G06F 17/00 | (2006.01) |
| H04N 1/04 | (2006.01) |
| H04L 29/06 | (2006.01) |
| G06F 17/24 | (2006.01) |
| H04N 1/00 | (2006.01) |

(52) U.S. Cl.
CPC ............. *H04N 1/04* (2013.01); *G06F 17/241* (2013.01); *H04L 65/403* (2013.01); *H04N 1/00244* (2013.01); *H04N 2201/0081* (2013.01); *H04N 2201/0084* (2013.01)

(58) Field of Classification Search
CPC .................................................. G06F 17/241
See application file for complete search history.

(56) References Cited

U.S. PATENT DOCUMENTS

| 5,181,255 A | 1/1993 | Bloomberg |
| 5,754,772 A | 5/1998 | Leaf |
| 6,108,444 A | 8/2000 | Syeda-Mahmood |

(Continued)

FOREIGN PATENT DOCUMENTS

| WO | WO 2011157092 A1 | 12/2011 |
| WO | WO 2012022940 A1 | 2/2012 |
| WO | WO 2012046005 A1 | 4/2012 |

OTHER PUBLICATIONS

Open Xerox: CopyFinder Service Home Page, 1999-2013 Xerox Corporation.

*Primary Examiner* — Keith Bloomquist
(74) *Attorney, Agent, or Firm* — Jones Robb PLLC

(57) ABSTRACT

Embodiments of the disclosure disclose methods, and systems for capturing, sharing and printing annotations. The method includes receiving a physical document including hand-written annotation, the hand-written annotation is made by a user corresponding to at least a portion of the physical document. The method further includes capturing the hand-written annotation and corresponding position information of the hand-written annotation, wherein capturing further includes capturing position information of the at least portion of the physical document. Further, the method includes storing the captured hand-written annotation, position information of the hand-written annotation and position information of the at least portion of the physical document. Moreover, the method includes associating the hand-written annotation to the at least portion of the physical document. Additionally, the method includes sharing the hand-written annotation with other users.

31 Claims, 13 Drawing Sheets

(56) References Cited

U.S. PATENT DOCUMENTS

| | | |
|---|---|---|
| 6,397,220 B1 | 5/2002 | Deisinger et al. |
| 7,546,524 B1 * | 6/2009 | Bryar et al. .................. 715/230 |
| 7,580,857 B2 | 8/2009 | VanFleet et al. |
| 7,742,953 B2 * | 6/2010 | King .................. H04N 1/00244 235/380 |
| 7,958,444 B2 | 6/2011 | Jacquin et al. |
| 8,046,305 B1 | 10/2011 | Barnett et al. |
| 8,442,331 B2 * | 5/2013 | King .................. G06F 17/218 382/229 |
| 8,874,504 B2 | 10/2014 | King et al. |
| 8,903,759 B2 * | 12/2014 | King .................. G06F 17/241 707/600 |
| 9,081,799 B2 | 7/2015 | King et al. |
| 9,143,638 B2 | 9/2015 | King et al. |
| 2003/0004991 A1 * | 1/2003 | Keskar et al. ................. 707/512 |
| 2005/0223315 A1 | 10/2005 | Shimizu et al. |
| 2006/0023945 A1 * | 2/2006 | King .................. H04N 1/00244 382/173 |
| 2006/0044619 A1 * | 3/2006 | Namiki .................. G06F 17/241 358/3.28 |
| 2006/0053097 A1 * | 3/2006 | King .................. G06F 17/30864 |
| 2006/0098899 A1 * | 5/2006 | King .................. G06F 17/30011 382/305 |
| 2007/0050712 A1 * | 3/2007 | Hull .................. G06F 17/241 715/234 |
| 2011/0025842 A1 * | 2/2011 | King .................. G06F 17/211 348/135 |
| 2011/0145068 A1 * | 6/2011 | King .................. G06F 17/211 705/14.55 |
| 2011/0154507 A1 * | 6/2011 | King .................. G06F 17/218 726/28 |
| 2012/0041941 A1 * | 2/2012 | King .................. G06F 17/218 707/711 |
| 2013/0046655 A1 | 2/2013 | Karkera et al. |
| 2013/0091240 A1 * | 4/2013 | Auger et al. .................. 709/217 |
| 2013/0129252 A1 * | 5/2013 | Lauper et al. ................. 382/276 |
| 2013/0132283 A1 | 5/2013 | Hayhow et al. |
| 2013/0222381 A1 * | 8/2013 | Di Censo .............. G06T 19/006 345/424 |
| 2014/0147004 A1 | 5/2014 | Uchida |

\* cited by examiner

*Phloem*

The phloem in the monocot stem consists of sieve tubes and companion cells. Phloem parenchyma and phloem fibres are absent. It can be distinguished into an outer crushed protophloem and an inner metaphloem.

*Xylem* [1] ——— 708

Xylem vessels are arranged in the form of the letter 'Y'. The two metaxylem vessels are located at the upper two arms and one or two protoxylem vessels at the base. In a mature bundle, the lowest protoxylem disintegrates and forms a cavity known as protoxylem lacuna.

*Primary structure of dicotyledonous stem - Sunflower stem*

Internal structure of dicotyledonous stem reveals epidermis, cortex and stele.

*Epidermis* [2] ——— 708

It is protective in fuiieiitni and lonih iheouicrauM layer of the stem. It is a single layer of parenctiyraaimis rectangular cells. The cells are compactly arranged wiilmm interceltular spaces. The outer walls of the epidermal cells have a layer called cutide. The cuitde checks the [4] transpiration. The cuticle il- made up of a waxy suhsiance known as cutin. Stomata may he preseni here and ihere. I pub m il cells are living. Chloroplasts are usually absent. A large number of multikellular hairs occur on ihe epidermis.

*Cortex* [3]

Cortex lies below the epidermis. The cortex is differentiated into three zones. Below the epidermis, there are a few layers of collenchyma cells. This zone is called hypodermis. [5] It gives mechanical strength to the stem. These cells are living and thickened at the corners. Inner to the hypodermis, a few layers of chlorenchyma cells are present with conspicuous intercellular spaces. This region performs photosynthesis. Some resinducts also occur here. The third zone is made up of parenchyma cells. These cells store food materials.

The innermost layer of the cortex is called endodermis. The cells of this layer are barrel shaped and arranged compactly without intercellular

Displaying Annotations http://www.pcmag.com/article2/0,2817,1623966,00.asp

QualityLogic's PageSense hardware and software
- by - David Yershaw

Annotations (2):
- This automated printer/driver is used for MFP - Multifunction Printer/Peripheral performance testing
  - David Yarshaw
- Also having the following features: Measure file size, data transfer rate, pages transferred per second, overall elapsed spool time
  - Vinachiwmer Add Application

716

METHODS AND SYSTEMS FOR CAPTURING, SHARING, AND PRINTING ANNOTATIONS

CROSS-REFERENCE TO RELATED APPLICATION(S)

Cross-reference is hereby made to U.S. application Ser. No. 14/190,173; entitled "Methods and Systems for Capturing, Sharing, and Printing Annotations"; filed simultaneously herewith.

TECHNICAL FIELD

The present disclosure generally relates to document handling, and more particularly, to methods and systems for capturing, sharing, and/or printing annotations related to physical documents.

BACKGROUND

It is a very common practice to annotate or take notes on various forms or written material. For example, a user reading a physical document may add comments relevant to the written material. In some cases, the user may add comments that are especially relevant to a certain portion of the written material, and may indicate a connection between the comments and the associated portion of the written material. For example, the user may add comments in a nearby available free space and/or connect the comments with the associated text. The user may also highlight or underline important content, or use other various marking strategies. In other words, a user may annotate a document by writing comments or notes in a nearby available free space, highlighting, or underlining content, or the like. In one example, the user may add a comment that is relevant to a sentence or phrase that the user considers will be better understood by virtue of the additional information. In another example, the user may highlight content that is considered important or that facilitates a better understanding of the written material.

However, the annotations discussed above are linked to the physical document and do not allow the user to share the annotations with others. The related art includes certain techniques for sharing annotations made on electronic documents, but fails to enable sharing of annotations made on physical documents. Therefore, there is a need for methods and systems enabling a user to share annotations on physical documents with other users.

SUMMARY

In one embodiment, a method for handling hand-written annotation related to one or more physical documents is disclosed. The method includes receiving a physical document including hand-written annotation, the hand-written annotation is made by a user corresponding to at least a portion of the physical document. The method further includes capturing the hand-written annotation and corresponding position information of the hand-written annotation, wherein capturing further includes capturing position information of the at least portion of the physical document. Further, the method includes storing the captured hand-written annotation, position information of the hand-written annotation and position information of the at least portion of the physical document. Moreover, the method includes associating the hand-written annotation to the at least portion of the physical document. Additionally, the method includes sharing the hand-written annotation with other users. The method as disclosed is performed by a processor.

In another embodiment, a machine-implemented method for capturing one or more hand-written annotations on a physical document is disclosed. The method includes receiving a physical document by a device, the physical document includes hand-written annotations corresponding to at least a portion of the physical document. The method further includes identifying the hand-written annotations from the physical document, wherein identifying includes separating background of the physical document from the hand-written annotations. Further, the method includes extracting the identified hand-written annotations, position information of the hand-written annotations, and position information of the at least portion of the physical document. Moreover, the method includes associating the hand-written annotations to the at least portion of the physical document. Additionally, the method includes storing the hand-written annotations along with the position information.

In still other embodiment, a device is disclosed. The device includes an imaging module configured for capturing a physical document including one or more hand-written annotations corresponding to at least a portion of the physical document, the one or more hand-written annotations are made by a user. The device further includes an application interacting with the imaging module, and is configured for: identifying the one or more hand-written annotations and position information of the hand-written annotations, and position information of the at least portion of the physical document; extracting the one or more hand-written annotations from the physical document, position information of the hand-written annotations, and position information of the at least portion of the physical document. Moreover, the device includes a processing module, interacting with the application, configured for sharing the one or more hand-written annotations with other users, based on a preference of the user.

In yet other embodiment, a system for capturing, and sharing one or more hand-written annotations on physical documents is disclosed. The system includes a mobile device including: an imaging module configured for capturing a physical document including hand-written annotations corresponding to at least a portion of the physical document, the hand-written annotations are made by a user. The system includes an application interacting with the imaging module configured for: identifying the hand-written annotations and position information of the hand-written annotations, and position information of the at least portion of the physical document; extracting the one or more hand-written annotations from the physical document, position information of the hand-written annotations, and position information of the at least portion of the physical document. The system further includes a processing module, interacting with the application, configured for sending the hand-written annotations along with the position information to a server. The system includes the server including a receiving module configured for receiving the hand-written annotations along with the position information from the mobile device; a storage module for storing the hand-written annotations and the position information; and a processing module for sharing the hand-written annotations with other users, when the other users reading a copy of the document.

BRIEF DESCRIPTION OF THE DRAWINGS

FIGS. 7A-7G are various exemplary snapshots related to annotations, according to an embodiment of the disclosure.

DETAILED DESCRIPTION

Figure 1:
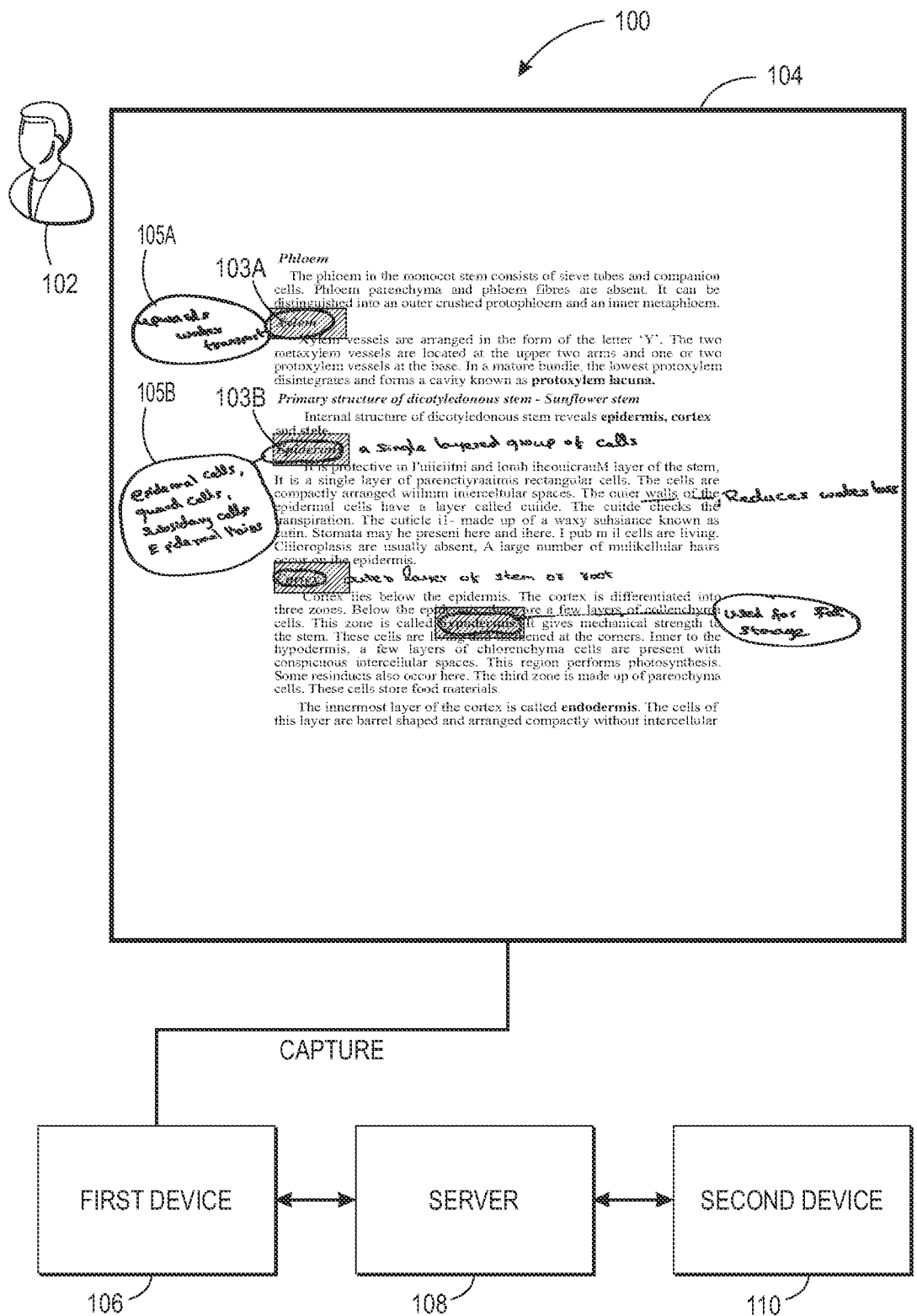
FIG. 1 illustrates an exemplary environment, in which various embodiments of the disclosure may be practiced.

The following detailed description is provided with reference to the figures. Exemplary, and in some case preferred, embodiments are described to illustrate the disclosure, not to limit its scope, which is defined by the claims. Those of ordinary skill in the art will recognize a number of equivalent variations in the description that follows.

DEFINITIONS

Definitions of one or more terms that will be used in this disclosure are described below. The term, "document" refers to any document such as an electronic document, or a physical document. Further, the "document" may be a document having a single page including text, images, or a combination of these or the document may have multiple pages. The phrase "annotation" includes any comments or notes, highlights, underlines, or any other types of remarks made by a user on the document. In the context of the present disclosure, the "annotation" made by the user refers to a hand-written annotation.

The term "device" is intended to include any device having capability of processing, storing, and/or displaying annotations and/or content to the user. Various examples of such devices can be, but not limited to, smart phones, tablets, Personal Digital Assistant (PDA), multi-function device, scanning device or so forth. In some cases, the "device" includes an imaging module such as a camera operable in an augmented reality mode or includes a scanning module. In general, "augmented reality" refers to the technology that superimposes computer-generated information, such as images, text, etc., on a user's view of the real world to provide a composite view in real time. In the context of the present disclosure, "augmented reality" superimposes hand-written annotation on a user's view of the real world. As used herein, a "Multi-Function Device" (MFD) is a single device that offers a number of traditionally separate functionalities, such as printing, copying, scanning, and/or faxing. An "application" running on the device can be any application which is configured for processing documents having hand-written annotations and communicating with other devices or modules. In particular, the "application" is configured for handling hand-written annotations, for example, capturing, sharing, and printing the hand-written annotations.

The term "server" refers to any device capable of processing annotations and/or any content related to the document and communicating with other devices in a network. In context of the present disclosure, the phrase "user" may refer to a user who annotates the document, whereas "other users" or "users" refer to the ones with whom the annotations made by the "user" are shared.

Overview

Some embodiments are directed to methods, and systems for capturing, sharing and printing annotations made by a user on a physical document. To this end, the present disclosure can be viewed as having an annotator end, a server end, and a viewer end. At the annotator end, a user makes one or more annotations on a physical document, and captures those annotations. The captured annotations are then sent to a server. At the server end, the annotations are stored/saved in any format, for example, an image format. The server shares the stored annotations with other users who are reading and/or viewing the same document. At the viewer end, the other users view the annotations shared by the server. In one embodiment, the other users can view the annotations using a device operable in an augmented reality mode, when reading a physical copy of the document. In another embodiment, the other users can view the annotations with the help of a browser-plug in, when reading an electronic copy of the document. In some embodiments, the annotations are printed for the other users.

FIG. 1 illustrates an exemplary environment 100, in which various embodiments of the present disclosure can be practiced, and includes a first device 106, a server 108, and a second device 110. The first device 106 is a device capable of handling documents and annotations related to the documents. For example, the first device 106 can be a mobile phone having a camera operable in an augmented reality mode. In other example, the first device 106 can be a multi-function device having a scanning module. In the context of the present disclosure, the first device 106 is configured for capturing annotations, particularly, hand-written annotations made on a physical document 104. The server 108 communicates with the first device 106 and the second device 110 to share the annotations made by a user 102 with other users. The second device 110 is a device similar to the first device 106. In the context of the present disclosure, the second device 110 is configured for displaying the annotations (captured via the first device 106) to other users. To enable the other users view the annotations using the second device 110, the second device includes a camera operable in an augmented reality mode. In some embodiments, the second device 110 can be same as the first device 106, alternatively, the second device 110 can be different from the first device 106. For example, the second device 110 can be a desktop, laptop, mobile phone, tablet, PDA, or any similar device without limitations.

Figure 7A:
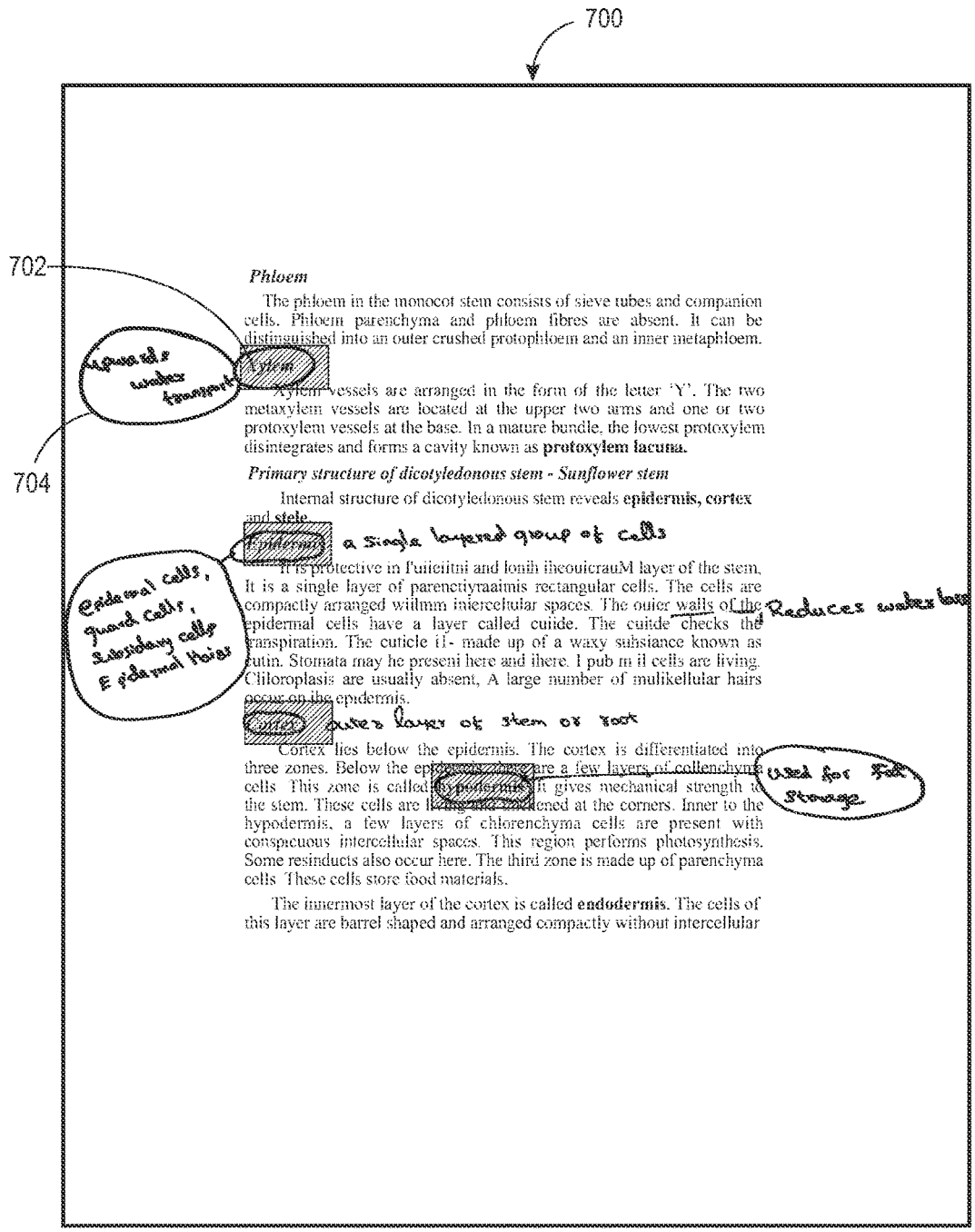
Figure 7B:
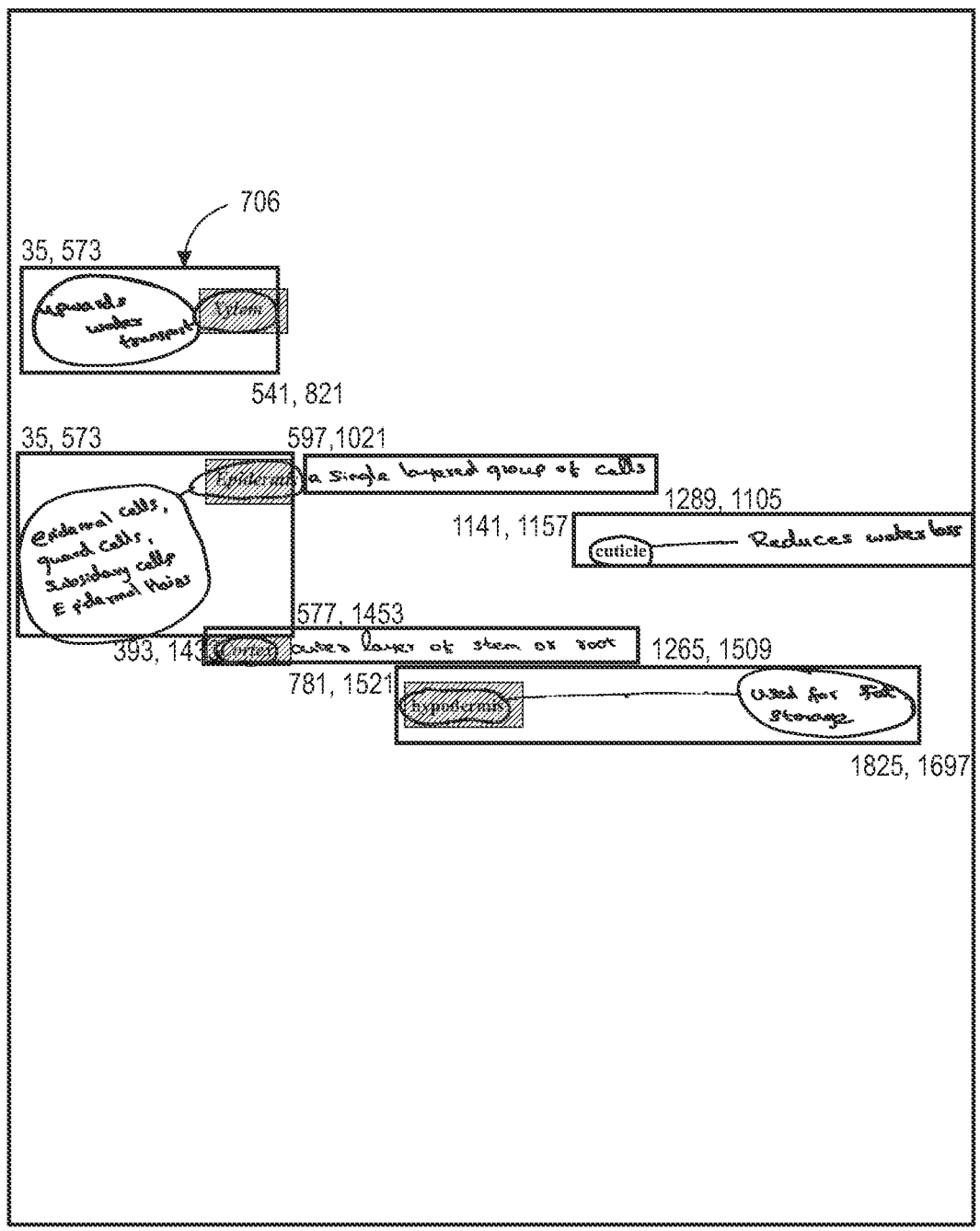

As shown, the user 102 reads a document and makes one or more annotations 105A, 105B (collectively 105) corresponding to at least a portion of the document 103A, 103B (collectively 103), respectively. The at least portion of the document 103 can be one or more phrases, one or more sentences, one or more paragraphs or the entire document. One exemplary snapshot is shown in FIG. 7A depicting a document 700 annotated by the user 102, where the numeral 704 denotes the annotation made by the user 102 corresponding to content 702 marked by the user 102. The user 102 uses the first device 106 to capture the annotations corresponding to the at least portion of the document as well as position information of the annotations. The annotations, the at least portion of the document, and position information (marked as 706) of the annotations as captured by the first device 106 are shown in FIG. 7B. After capturing these details, the first device 106 interacts with the server 108 and transmits the captured annotations, position information and the at least portion of the document, to the server 108 for storage and later retrieval. The server 108 saves the received information in any desired format. The server 108 shares the annotations with the other users who are reading the same document. In some embodiments, the annotations can be shared as plain text, alternatively, the annotations can be shared as objects or images. The other users view the annotations using the second device 110.

In some embodiments, the server 108 creates a database including association between the at least portion of the physical document and annotations.

Figure 2:
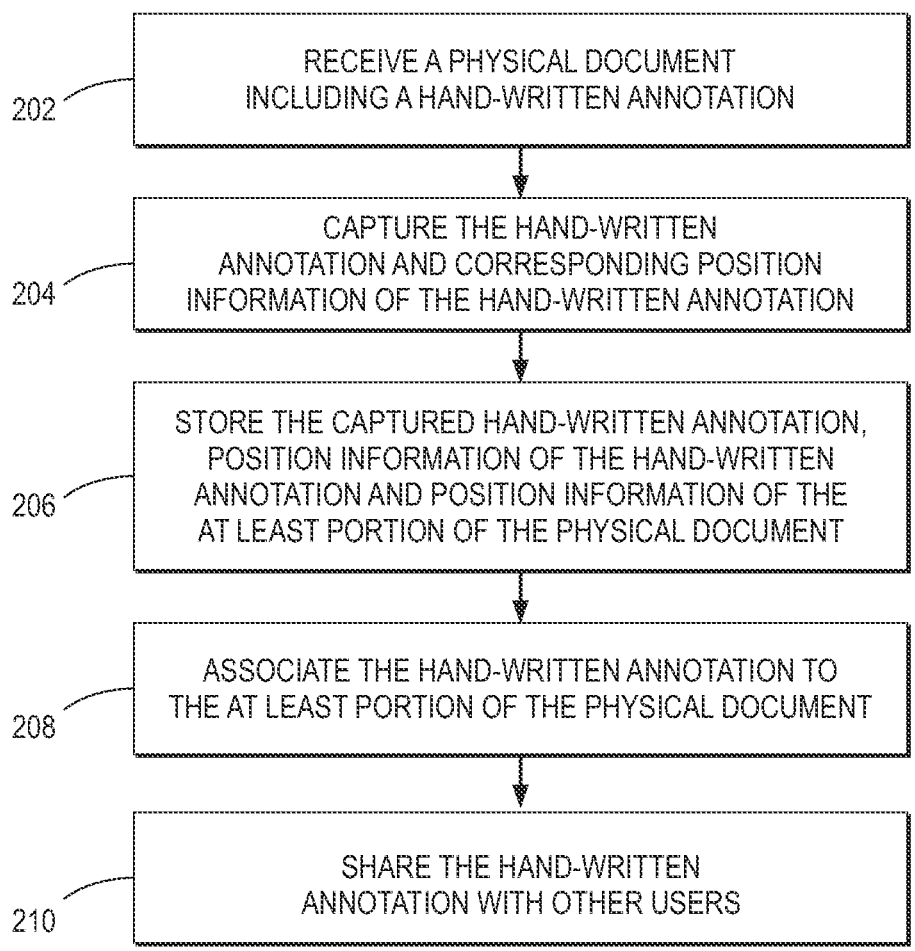
FIG. 2 is a flowchart for sharing annotations on a document, according to an embodiment of the disclosure.

FIG. 2 is a flowchart for handling hand-written annotations on a document. Handling of the hand-written annotations involves capturing, sharing and printing of the annotations without any limitations. The document can be a physical document or an electronic document. For the purposes of simplicity, the present disclosure will be explained taking an example of a physical document, but for a person skilled in the art, it is understood that the disclosure is not limited to this embodiment.

Initially, a user annotates a physical document. The annotation made by the user is hereinafter referred to as hand-written annotation. At 202, the method includes receiving the physical document by a device such as a mobile device or a multi-function device. The physical document includes hand-written annotation made by the user corresponding to at least a portion of the document. Then, the device scans the document along with the hand-written annotation. After scanning, at 204, the hand-written annotation and corresponding position information of the hand-written annotation are captured from the document. Along with this, the at least portion of the document and the position information of the document are also extracted. In some embodiments, the method includes identifying position information of the hand-written annotation as well the position information of the least portion of the document. Thereafter, the captured hand-written annotation, position information of the hand-written annotation, the at least portion of the document, and/or position information of the at least portion of the document are sent to a server. At 206, the server stores the received information for later retrieval/use.

Then at 208, the hand-written annotation is associated to the at least portion of the document and this is performed by the server. Finally, at 210, the extracted hand-written annotation is shared with other users. The hand-written annotation is shared when the other users access the same document, for example, when the other users read and/or view a copy of the document. In some embodiments, the hand-written annotation is shared with the other users based on a preference defined by the user, who has annotated the document. The hand-written annotation can be shared in one of a mode: private and public. In the private mode, the user defines or creates a group of people with whom he wishes to share the hand-written annotation and this can be accomplished via messages, emails, multimedia messages or any similar techniques. Before sharing the annotation, the step of authentication may be performed. For example, the server may authenticate each user of that group to receive the hand-written annotation. In the public mode, the hand-written annotation is shared with all the users who are accessing the same document. For example, the hand-written annotation is shared when the other users view and/or read a copy of the document. The copy can be a physical copy or an electronic copy of the document.

In cases where the other users are viewing a physical copy of the document, then the hand-written annotation is shared via a mobile device or equivalent device of those users, particularly, via a camera view in an augmented reality mode. In such cases, the other users require hovering their mobile device over the document they are viewing. After this, the mobile device identifies the document and interacts with the server to retrieve any annotations available corresponding to that document. Subsequently, the annotations are displayed to the users via the mobile device.

In some embodiments, the method includes placing markers on the document to notify the availability of annotations for a particular portion/position of the document. These markers may be placed when the number of annotations for the document exceed a pre-defined value, for example ten. The pre-defined value may be defined by the server. In other examples, the markers may be placed based on the content of the annotations. Upon actuation, the annotations can be displayed to the other users. For example, a user may click the marker or may touch the marker to view the annotations.

In cases, where the other users are viewing an electronic copy, then the server automatically determines the annotations available corresponding to that document or a portion of the document, and based on the availability, the annotations are shared and are subsequently displayed to the other users.

Figure 7D:
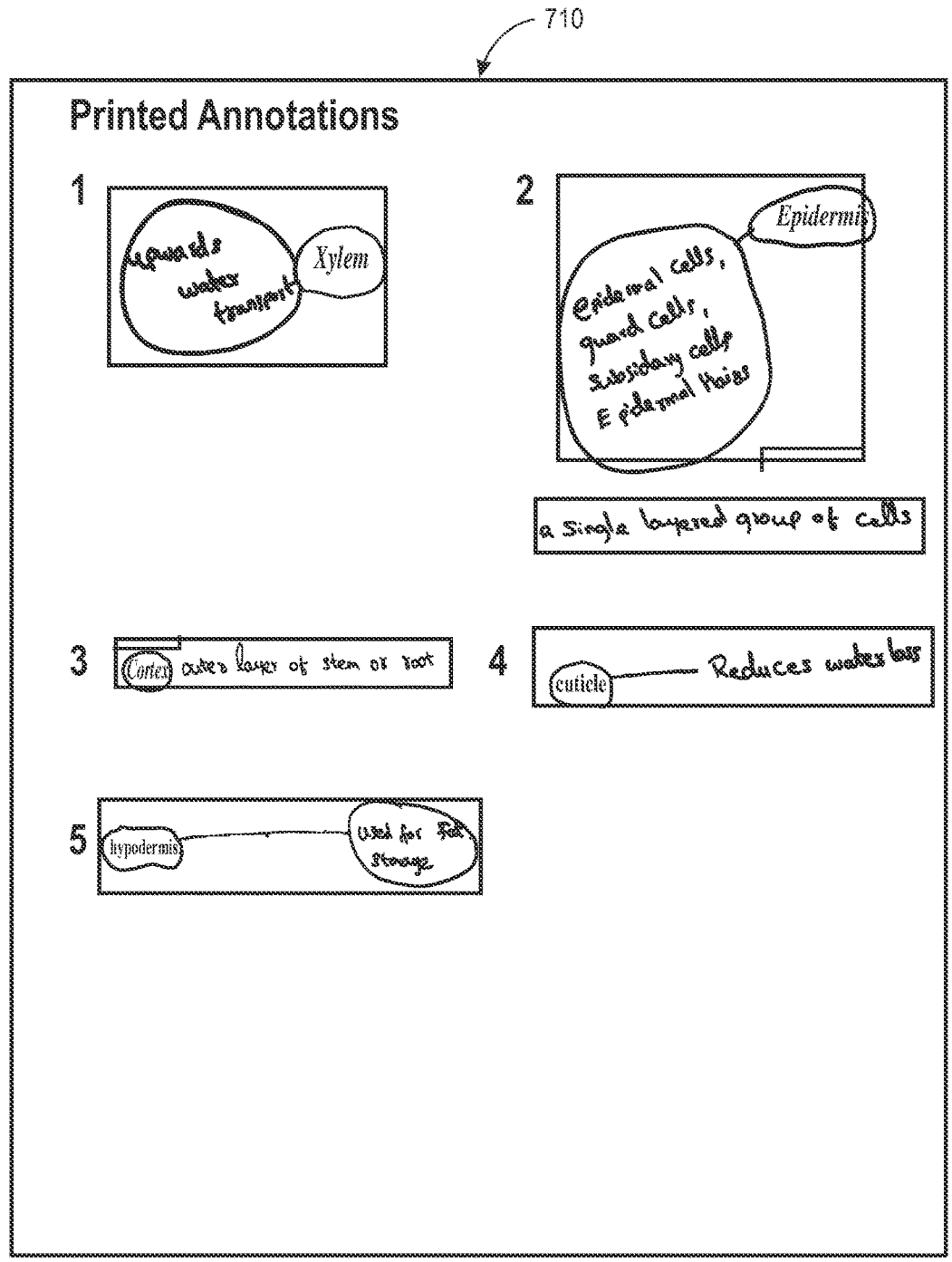

In some embodiments, the hand-written annotation is printed upon receiving a request from the other users. The request received from the other users may relate to printing, scanning and/or photocopying the document. While processing the document, the device identifies the document and checks for any available annotations stored in the server. If so, the annotations are printed along with the document request. In some cases, the annotations can be embedded at the desired position inside the document, while in other cases, one or more references numbers (marked as 708) can be placed inside the document (see FIG. 7C) instead of annotations. The reference numbers correspond or relate to the annotations made by the user. Subsequently, the reference numbers and the annotations can be printed as a separate page, marked as 710 (see snapshot of FIG. 7D). In additional cases, the annotations can be printed as appendix or footnote.

In some embodiments, the method includes converting the hand-written annotation into a digitized format.

In some embodiments, the method includes validating the hand-written annotation made by the user. For example, a subject matter expert may validate and thus, approves the hand-written annotation. Based on his approval, the hand-written annotation is shared publicly with the other users. This is done to ensure accuracy of the hand-written annotation made by the user. In some cases, the subject matter may approve multiple hand-written annotations corresponding to the same portion of the document. The multiple hand-written annotations may be made by the same user or may be made by different users.

Figure 3:
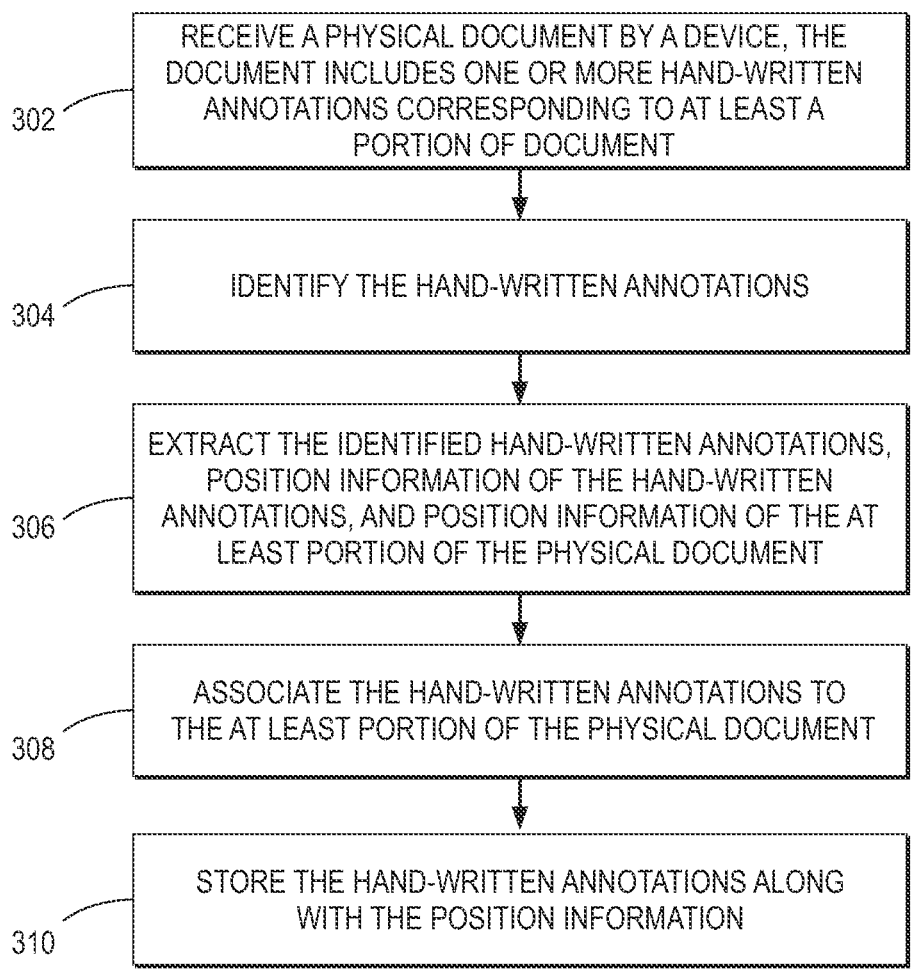
FIG. 3 is flowchart for capturing annotations on a document, according to an embodiment of the disclosure.

FIG. 3 is a method flowchart for capturing hand-written annotation, according to an embodiment of the disclosure. The method begins with a user highlighting, or marking content in a document and adding one or more hand-written annotations corresponding to that content. At 302, a physical document is received by a device, the physical document includes one or more hand-written annotations corresponding to at least a portion of the document. The device can be a mobile device or can be a multi-function device. The device then identifies and scans the received document. In case of the mobile device, the document is scanned via a camera, alternatively, the document is scanned through the multi-function device. After scanning, at 304, the hand-written annotations are identified. The step of identifying includes separating the physical document (i.e., printed content or background information) from the hand-written annotations. For identifying the hand-written annotations and the printed content, a number of techniques are available and thus, can be utilized. Based on that identification, the hand-written annotations are extracted from the document along with their position information, at 306. Along with this, the at least portion of the document i.e., content corresponding to which the user has made the annotations and position information of the at least portion of the document are extracted. In some embodiments, dimensions, for example, boundary of the document are extracted. One exemplary snapshot of information extracted by the device is shown in FIG. 7B. At 308, the hand-written annotations are associated to the least portion of the document. At 310, the hand-written annotations are stored along with the position information. In some examples, the information is stored by the server.

Figure 4:
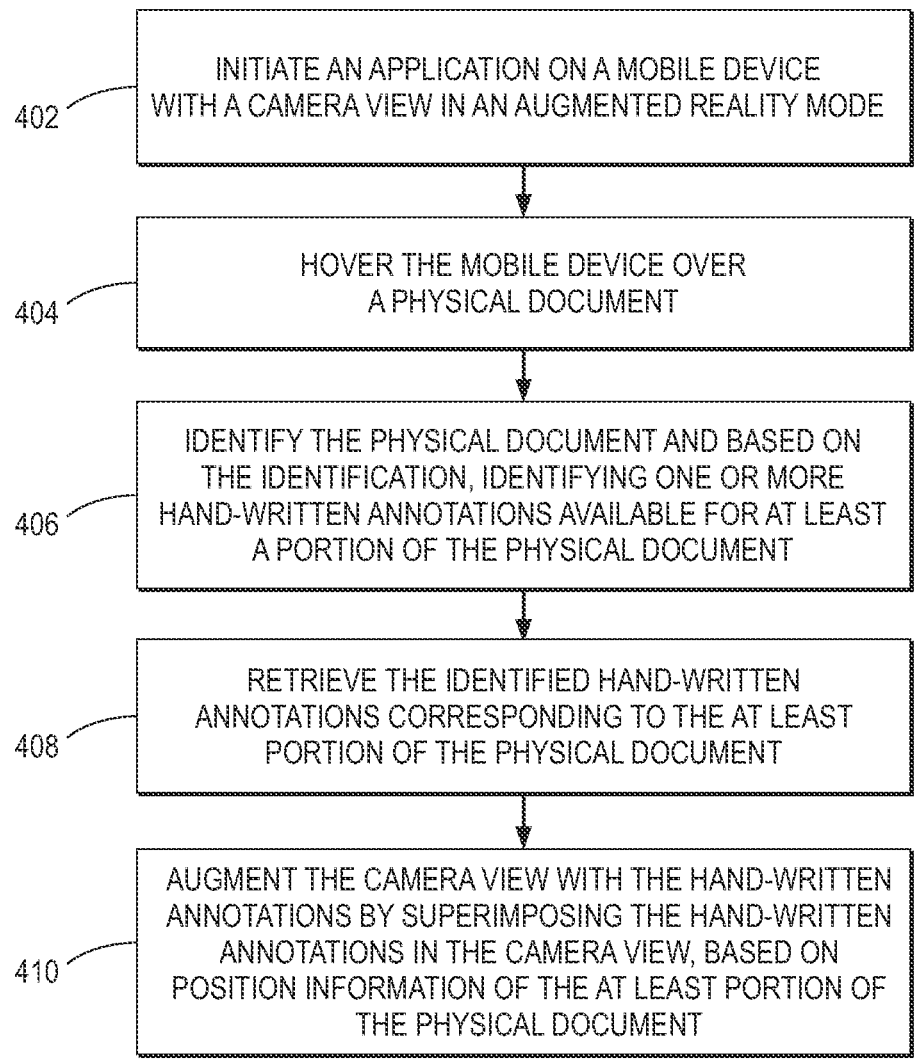
FIG. 4 is a flowchart for viewing annotations on a document, according to an embodiment of the disclosure.

FIG. 4 is a flowchart specific to a method of viewing hand-written annotations related to a document. The flowchart may be implemented for scenarios, where the other users are viewing and/or reading a physical copy of the document and wish to view the annotations corresponding to that document.

Figure 7E:
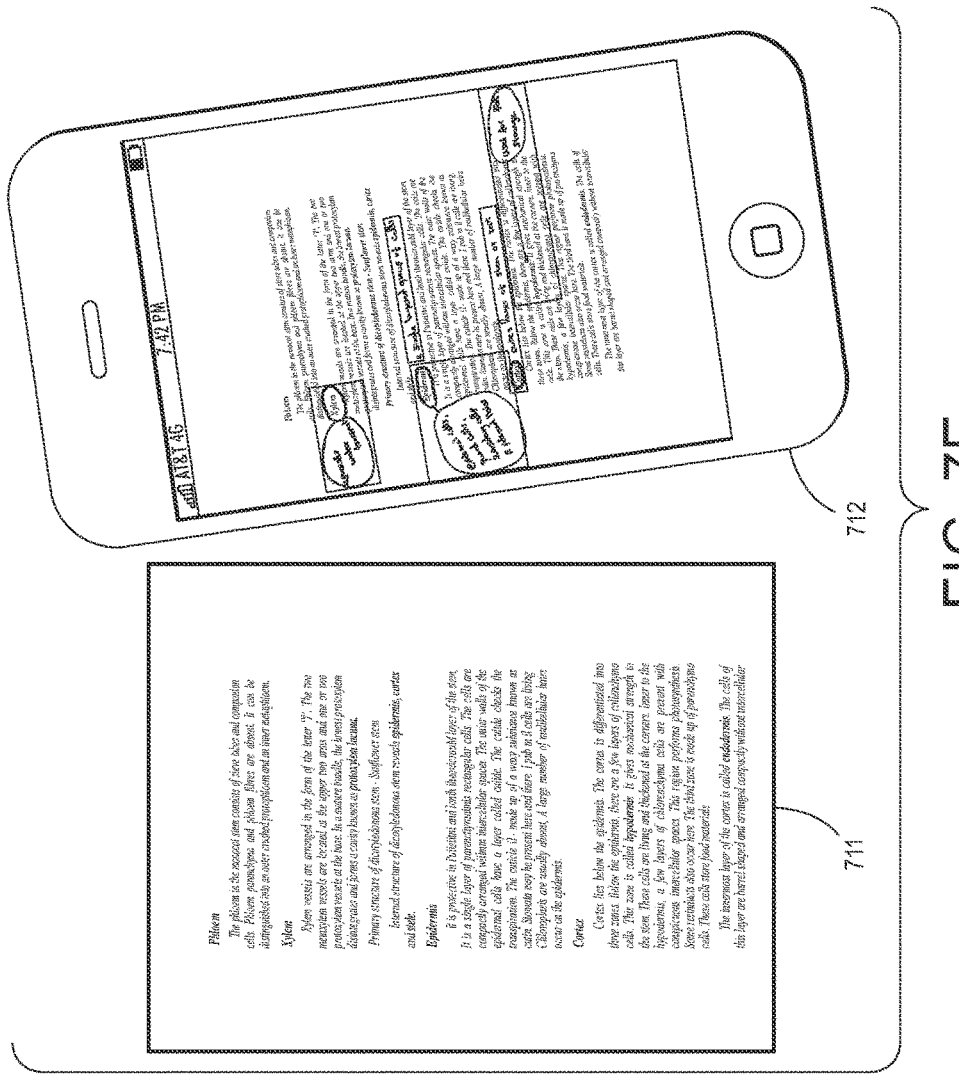

An application is initiated on a mobile device with a camera view in an augmented reality mode, at 402. The device is then hovered over a physical copy of the document (marked as 711, FIG. 7E), at 404. The device or the application identifies the document and its dimensions at 406. Based on that identification, one or more hand-written annotations available for at least a portion of the document are identified. For this, the device interacts with the server and shares the identified information with the server. Based on the received information, the server identifies annotations and retrieves the identified annotations corresponding to the at least portion of the document at 408. Subsequently, the server sends the hand-written annotations and the position information to the device. Finally, at 410, the application augments the camera view with the hand-written annotations by superimposing the hand-written annotations in the camera view, based on the position information of the at least portion of the document. In this manner, the users can view the hand-written annotations on their devices, mobile devices, for example. One such snapshot of the device 712 displaying the hand-written annotations is shown in FIG. 7E.

In some embodiments, the method includes determining position of the hand-written annotations in the camera view. The position can be determined using one or more context sensitive methods as known in the art. Then, the hand-written annotations are positioned in the camera view. In some embodiments, the hand-written annotations are positioned according to the original position information as received from the server. In other embodiments, the hand-written annotations may be positioned based on their relative position with respect to the document content. Here, the method also includes determining relative position of the hand-written annotation, based on relative position of the at least portion of the physical document in the camera view. In such cases, before positioning or superimposing the hand-written annotations over the physical document, boundary of the document is identified.

For the sake of understanding, an example has been described. Consider a physical document with the word "Xerox" and its associated hand-written annotation as "Document Company". The server may have line number and co-ordinates of "Xerox" and co-ordinates of "Document Company" associated with it. When the physical document in augmented reality view is cropped (using border detection and processed for OCR), the line number and co-ordinates of the printed content, i.e., "Xerox" is identified. Hand-written annotation "Document Company" is overlaid near "Xerox" relative to the co-ordinates of the annotation "Document Company" and word "Xerox" in the server. In the server, if the coordinates of "Xerox" is "100*200" and "Document Company" is "200*200"; and the co-ordinates of "Xerox" in AR cropped view is "50*100", then, co-ordinates of "Document Company" which may be overlaid are "100*100".

For a person skilled in the art, it is understood that OCR as mentioned above is just an exemplary, other techniques may also be utilized. In some embodiments, the phrase "Xerox" can be identified based on image matching and the annotations can be placed accordingly.

Figure 7F:
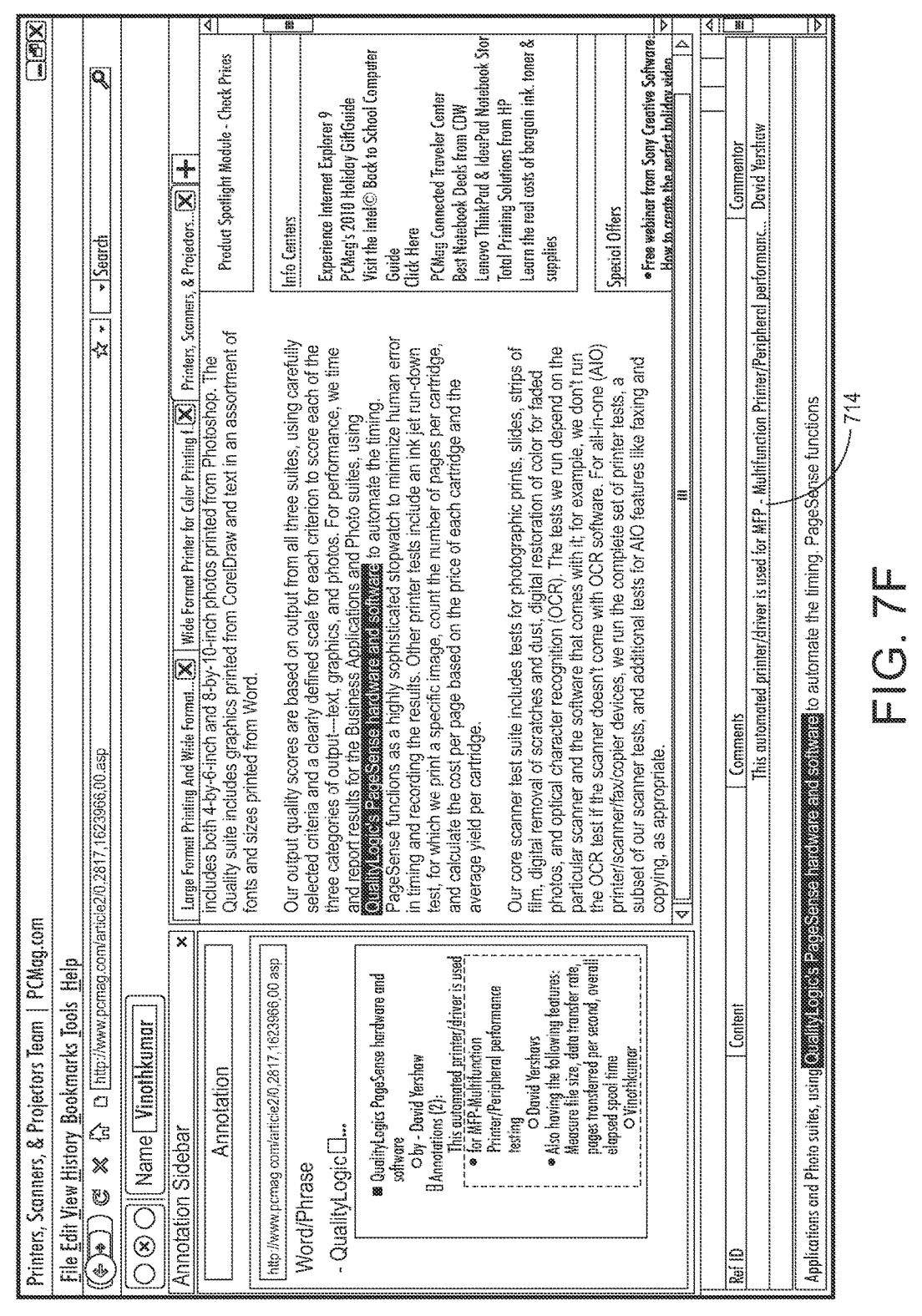

In additional embodiments, the method of viewing annotations related to a document is explained for scenarios, where the other users are viewing the document online. In such instances, the method utilizes a plug-in such as a browser plug-in, installed on a device used by a user. The method begins with the user reading a document, and while reading, the browser plug-in identifies the document. Then, the plug-in automatically communicates with the server and communicates the identified information to the server. The server then identifies one or more available annotations corresponding to at least a portion of document and transmits the annotations to the plug-in. The plug-in then inserts or positions the annotations over the document. The technique of positioning the hand-written annotation over the document has been discussed above in detail. In some cases, the annotations are displayed to the user at the bottom of the page (marked as 714, FIG. 7F). One such snapshot is shown in FIG. 7F. In other cases, the annotations are displayed to the user as a separate page 716 as shown in FIG. 7G.

Figure 5:
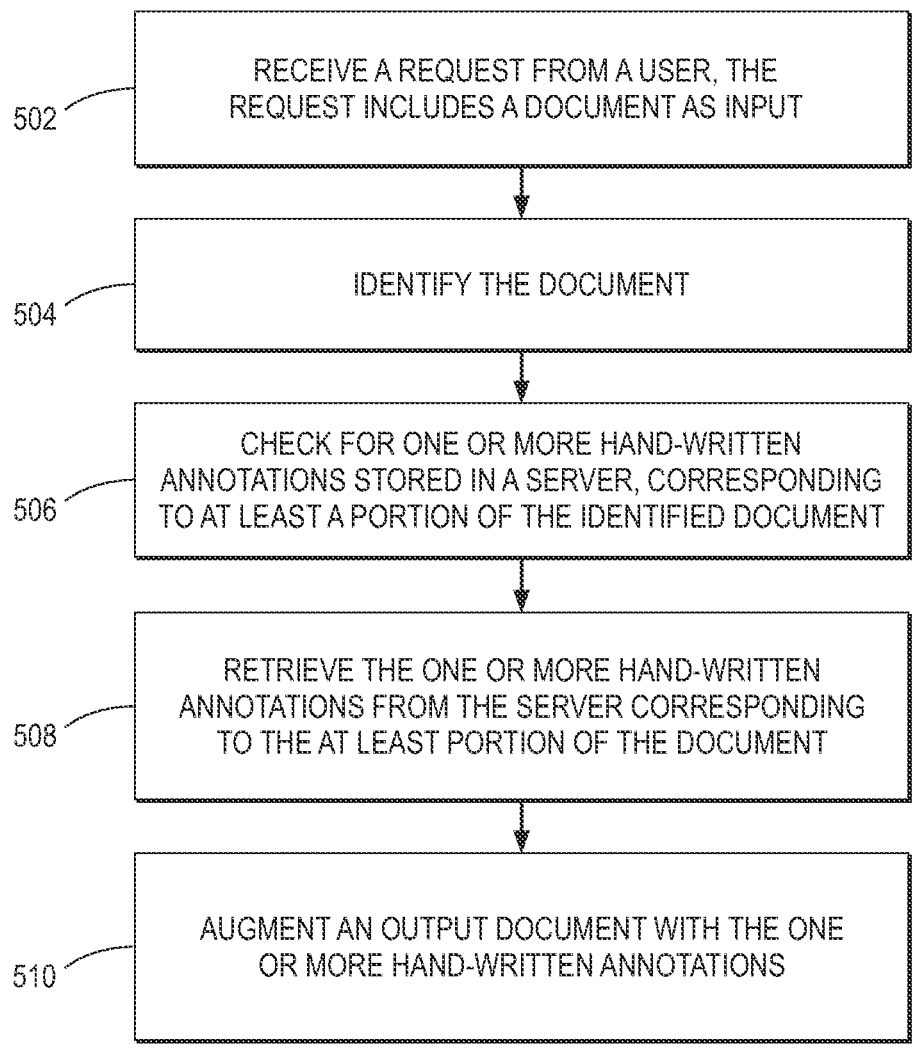
FIG. 5 is a flowchart for printing annotations, according to an embodiment of the disclosure.

FIG. 5 is a flowchart specific to a method of printing hand-written annotations. The method may be implemented for scenarios where a user wishes to perform at least one of: printing, scanning, and/or photocopying of a document. The method begins with receiving a request from a user, the request includes a document as input at 502. The request received from the user may relate to printing, scanning, or photocopying a document. The request is received by a device such as a multi-function device. While processing the request, the document received is identified at 504. Upon identification, the device interacts with the server. The server checks for one or more hand-written annotations corresponding to at least a portion of the identified document at 506. If present, the hand-written annotations are retrieved corresponding to the at least portion of the document at 508 and sent to the device. While the device generates an output document, and that output document is augmented with the hand-written annotations at 510. Here, the output document may be one of a printed document, scanned document and a photocopied document.

In some embodiments, the hand-written annotations are merged/embedded at appropriate positions in the output document.

In certain embodiments, before generating the output document, the device inserts one or more reference numbers corresponding to the at least portion of the document, the reference numbers link or relate to the hand-written annotations. Then, the document with reference numbers is printed and the annotations are printed as a supplement page. Alternatively, the annotations are printed as an appendix page or footnote.

For a person skilled in the art, it is understood that the methods discussed above can be implemented using any machine, device or system having a processor. In some embodiments, an application may be configured to execute the methods as discussed above or to handle the hand-written annotations.

Figure 6:
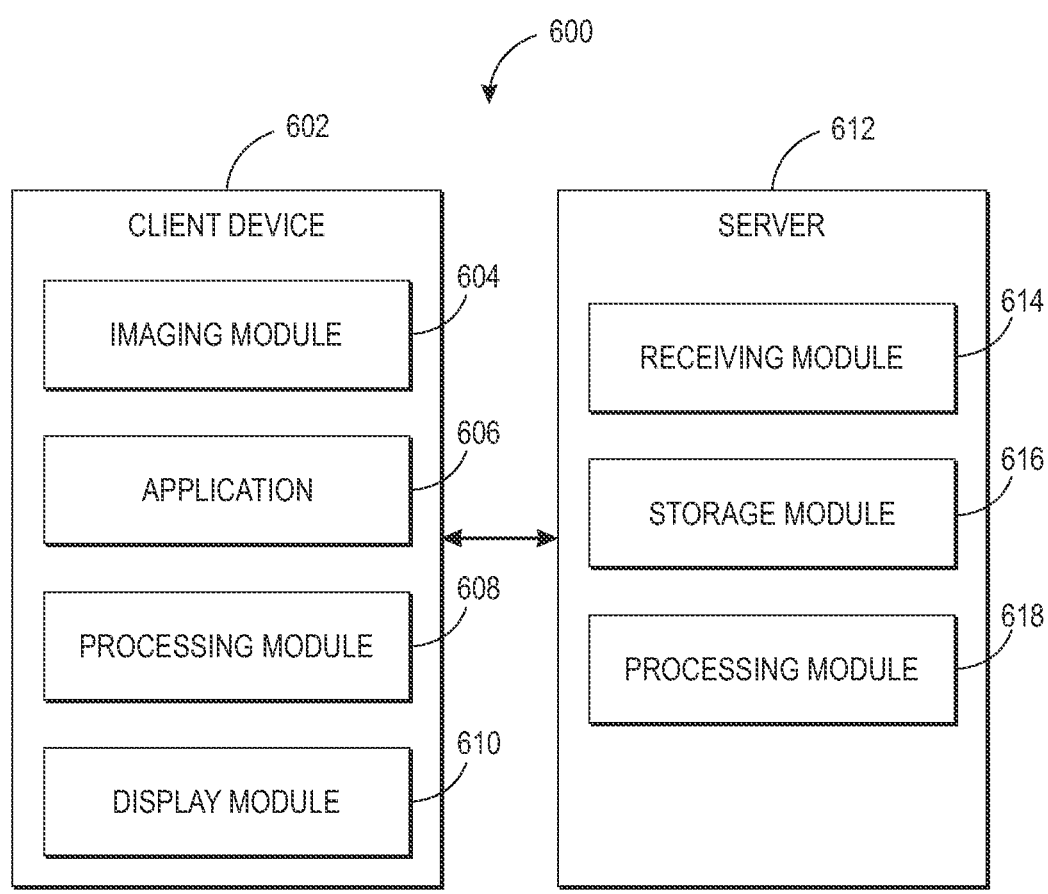
FIG. 6 is a system for handling annotations on documents, according to an embodiment of the disclosure.

FIG. 6 shows an exemplary system, according to an embodiment of the present disclosure. As shown, the system 600 includes a client device 602 and a server 612. The client device 602 includes an imaging module 604, a display 610, a processing module 608, and an application 606 running on the device 602. Various examples of the device 602 can be a mobile device, a multi-function device or the like. The server 612 includes a receiving module 614, storage module 616, and a processing module 618. The client device 602 interacts with the server 612 through a network. The network may be wired or wireless. Network includes all types of conventional wired or wireless network. Various examples of such networks include, but not limited to, Local Area Network (LAN), Wide Area Network (WAN), a Metropolitan Area Network (MAN), Wireless LAN, and so forth. Additionally, the network can be a local, regional, or global communication network such as an enterprise telecommunication network, the Internet, a global mobile communication network, or any combination of similar systems.

Client Device

The imaging module 604 is a traditional module such as camera, configured for capturing an image. In the context of present disclosure, the imaging module 604 is configured for capturing a document that includes one or more hand-written annotations. In the case of a mobile device, the imaging module 604 is a camera. In some cases, the camera may be operable in an augmented reality mode. One of skill in the art will understand the concepts of augmented reality along with its implementation on the device 602. When the device 602 is operating in the augmented reality mode, the hand-written annotations superimposed on the document are displayed to the user. In the case of a multi-function device, the imaging module 604 is a scanning module. The imaging module 604 then interacts with an application 606 running on the device 602 for further processing.

The application 606 is configured for handling the hand-written annotations related to the document. Handling the hand-written annotations involves capturing the hand-written annotations, sharing the hand-written annotations, and/or printing the hand-written annotations. In particular, the application 606 is configured for identifying the printed content and hand-written annotations made by a user. Upon identification, the application 606 identifies position information of the hand-written annotations and content corresponding to which the user has made annotation. The application 606 then passes the identified information to the processing module 608 for further operations. In many embodiments, the application 606 is configured for positioning hand-written annotations over the physical document.

The processing module 608 then interacts with another device in a network such as a server. Here, the processing module 608 transmits the hand-written annotation, position information and corresponding content to the server 612. The server 612 then saves this information in any desired format.

The display module 610 is configured for displaying information to the user. In the context of the present disclosure, the display module 610 enables the user to view the hand-written annotations received from the server 612.

Server

The server 612 is configured for processing requests received from the client device 602.

The receiving module 614 is configured for receiving information from the client device 602. The information includes hand-written annotations, position information, a portion of the document corresponding to which the user has made annotation. Along with this, the server receives position information of the portion of the document. In some cases, the receiving module 614 also receives dimensions of the document.

The storage module 616 is configured for storing the received information in any desired format. One such format can be an image format.

The processing module 618 is configured for sharing the hand-written annotations with other users who are viewing and/or reading a copy of the document. The other users may be viewing and/or reading the copy of the document using their devices, for example, mobile devices. The mobile device includes an application installed on it and the application enables the users to view the annotations in an augmented reality view. In those embodiments, the application is configured for positioning the hand-written annotations over the physical document. In some cases, the hand-written annotations are positioned at original location/position, while in other cases, the hand-written annotations are positioned relative to the position of the least portion of the document in the camera view. In the latter case, the application is configured to determine the relative positions of the hand-written annotations with respect relative position of the at least portion of the document in a camera view.

The present disclosure discloses methods, and systems for automatically capturing and sharing annotations with one or more users, thereby eliminating manually sharing a document having annotation, for example, via email, photocopy or the like.

For a person skilled in the art, it is understood that one or more blocks or steps of the flowchart/method, and combinations of blocks or steps in the flowchart, can be implemented by a hardware device including a processor, computer program product, or a combination of hardware device or software that is capable of executing application and/or instructions.

It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method for handling hand-written annotations related to one or more physical documents, the method comprising:
   receiving a physical document including a hand-written annotation, the hand-written annotation is made by a user corresponding to at least a portion of the physical document, wherein the hand-written annotation is one of a plurality of hand-written annotations corresponding to the portion of the physical document;
   capturing the hand-written annotation and corresponding first position information of the hand-written annotation, wherein capturing further includes capturing a second position information of the at least portion of the physical document;
   storing the captured hand-written annotation, first position information of the hand-written annotation and second position information of the at least portion of the physical document;

associating the hand-written annotation to the at least portion of the physical document;
upon cropping a camera view of the physical document, obtaining a third position information of the at least portion of the physical document;
determining a relative position of the hand-written annotation based on a relative position of the at least portion of the physical document in the camera view, wherein the relative position of the at least portion of the physical document is based on the third position information being relative to the second position information of the at least portion of the physical document, and wherein the relative position of the hand-written annotation is based on a fourth position information of the hand-written annotation relative to the first position information of the hand-written annotation;
determining that a quantity of the plurality of hand-written annotations corresponding to the portion of the physical document exceeds a pre-defined quantity;
displaying, within the camera view, a marker indicating a presence of the plurality of hand-written annotations; and
sharing the hand-written annotation with other users, wherein the method is performed by a processor.

2. The method of claim 1, further comprising scanning the physical document.

3. The method of claim 2, wherein scanning is performed using a mobile device camera.

4. The method of claim 1, further comprising sharing the hand-written annotation with the other users via the camera view in an Augmented Reality Mode.

5. The method of claim 4, further comprising determining position of the hand-written annotation in the camera view.

6. The method of claim 5, wherein the position of the hand-written annotation is determined using one or more context sensitive methods.

7. The method of claim 5, further comprising positioning the hand-written annotation in the camera view.

8. The method of claim 7, wherein the hand-written annotation is positioned according to the extracted position information.

9. The method of claim 7, further comprising determining relative position of the hand-written annotation, based on relative position of the at least portion of the physical document in the camera view.

10. The method of claim 1, further comprising sharing the hand-written annotation when receiving a request from the other users, wherein the request includes printing, scanning or photocopying of the physical document.

11. The method of claim 10, further comprising identifying at least a portion of the physical document to be augmented.

12. The method of claim 11, further comprising augmenting the printed, scanned or photocopied document with the hand-written annotation.

13. The method of claim 12, further comprising injecting a reference number corresponding to the identified portion in the printed, scanned or photocopied document, wherein the reference number relates to the hand-written annotation.

14. The method of claim 13, wherein the hand-written annotation is included as a footnote, or a part of appendix.

15. The method of claim 13, wherein the hand-written annotation is printed.

16. The method of claim 12, further comprising embedding the hand-written annotation in the printed, scanned or photocopied document.

17. The method of claim 1, further comprising creating a database including association between the at least portion of the physical document and hand-written annotation.

18. The method of claim 1, further comprising converting the hand-written annotation into a digitized format.

19. The method of claim 1, wherein the hand-written annotation is shared with the other users, based on a preference of the user.

20. The method of claim 19, wherein the hand-written annotation is shared in at least one of a private and public mode.

21. The method of claim 20, wherein the hand-written annotation is validated for accuracy, when the hand-written annotation is shared in the public mode.

22. The method of claim 20, wherein the private mode is defined by the user to include one or more users.

23. A machine-implemented method for capturing one or more hand-written annotations on a physical document, comprising:
receiving a physical document by a device, the physical document includes one or more hand-written annotations corresponding to at least a portion of the physical document;
identifying the hand-written annotations from the physical document, wherein identifying includes separating background of the physical document from the hand-written annotations;
extracting the identified hand-written annotations, first position information of the hand-written annotations, and second position information of the at least portion of the physical document;
associating the hand-written annotations to the at least portion of the physical document;
upon cropping a camera view of the physical document, obtaining a third position information of the at least portion of the physical document;
determining a relative position of the hand-written annotations based on a relative position of the at least portion of the physical document in the camera view, wherein the relative position of the at least portion of the physical document is based on the third position information being relative to the second position information of the at least portion of the physical document, and wherein the relative position of the hand-written annotations is based on a fourth position information of the hand-written annotations relative to the first position information of the hand-written annotations;
determining that a quantity of the hand-written annotations corresponding to the portion of the physical document exceeds a pre-defined quantity;
displaying, within the camera view, a marker indicating a presence of the hand-written annotations; and
storing the hand-written annotations along with the marker and the position information.

24. The machine-implemented method of claim 23, wherein the hand-written annotations are captured using a scanning device.

25. The machine-implemented method of claim 23, wherein the hand-written annotations are captured using a device.

26. The machine-implemented method of claim 23, further comprising scanning the physical document.

27. A device, comprising:
an imaging module configured for capturing a physical document including one or more hand-written annotations corresponding to at least a portion of the physical document, the one or more hand-written annotations are made by a user;
an application interacting with the imaging module, configured for:
identifying the one or more hand-written annotations and first position information of the one or more hand-written annotations, and second position information of the at least portion of the physical document;
extracting the one or more hand-written annotations from the physical document, first position information of the one or more hand-written annotations, and second position information of the at least portion of the physical document;
obtaining a third position information of the at least portion of the physical document upon cropping a camera view of the physical document; and
determining a relative position of the one or more hand-written annotations based on a relative position of the at least portion of the physical document in the camera view, wherein the relative position of the at least portion of the physical document is based on the third position information being relative to the second position information of the at least portion of the physical document, and wherein the relative position of the one or more hand-written annotations is based on a fourth position information of the one or more hand-written annotations relative to the first position information of the one or more hand-written annotations;
determining that a quantity of the one or more hand-written annotations corresponding to the portion of the physical document exceeds a pre-defined quantity;
displaying, within the camera view, a marker indicating a presence of the one or more hand-written annotations; and
a processing module, interacting with the application, configured for:
sharing the one or more hand-written annotations with other users, based on a preference of the user.

28. The device of claim 27, wherein the imaging module is further configured for scanning the physical document.

29. The device of claim 27, wherein the processing module is further configured for sending the one or more hand-written annotations to a server.

30. The device of claim 27, wherein the application is further configured for positioning one or more hand-written annotations on a document, when the document is viewed by the other users.

31. A system for capturing, and sharing one or more hand-written annotations on physical documents, the system comprising:

a mobile device including:
an imaging module configured for capturing a physical document including hand-written annotations corresponding to at least a portion of the physical document, the hand-written annotations are made by a user;
an application interacting with the imaging module, configured for:
identifying the hand-written annotations and a first position information of the hand-written annotations, and a second position information of the at least portion of the physical document;
extracting the hand-written annotations from the physical document, first position information of the hand-written annotations, and second position information of the at least portion of the physical document;
upon cropping a camera view of the physical document, obtaining a third position information of the at least portion of the physical document;
determining a relative position of the hand-written annotations based on a relative position of the at least portion of the physical document in the camera view, wherein the relative position of the at least portion of the physical document is based on the third position information being relative to the second position information of the at least portion of the physical document, and wherein the relative position of the hand-written annotations is based on a fourth position information of the hand-written annotations relative to the first position information of the hand-written annotations;
determining that a quantity of the hand-written annotations corresponding to the portion of the physical document exceeds a pre-defined quantity;
displaying, within the camera view, a marker indicating a presence of the hand-written annotations; and
a processing module, interacting with the application, configured for:
sending the hand-written annotations along with the position information to a server; and
the server including:
a receiving module configured for receiving the hand-written annotations along with the position information from the mobile device;
a storage module for storing the hand-written annotations and the first and second position information; and
a processing module for sharing the hand-written annotations with other users, when the other users reading a copy of the document.

* * * * *